US012338834B1

(12) United States Patent
He

(10) Patent No.: US 12,338,834 B1
(45) Date of Patent: Jun. 24, 2025

(54) FAN DEVICE

(71) Applicant: GUANGDONG LAC SMART LIGHTING CO., LTD, Guangdong (CN)

(72) Inventor: Xiaoming He, Guangdong (CN)

(73) Assignee: GUANGDONG LAC SMART LIGHTING CO., LTD, Dongguan (CN)

( * ) Notice: Subject to any disclaimer, the term of this patent is extended or adjusted under 35 U.S.C. 154(b) by 0 days.

(21) Appl. No.: 19/031,669

(22) Filed: Jan. 18, 2025

(30) Foreign Application Priority Data

Jan. 10, 2025 (CN) ......................... 202520063615.2

(51) Int. Cl.
*F04D 29/36* (2006.01)
*F04D 19/00* (2006.01)
*F04D 25/08* (2006.01)
*F04D 29/62* (2006.01)
*F21V 33/00* (2006.01)

(52) U.S. Cl.
CPC ........... *F04D 29/36* (2013.01); *F04D 19/002* (2013.01); *F04D 25/088* (2013.01); *F04D 29/624* (2013.01); *F21V 33/0096* (2013.01)

(58) Field of Classification Search
CPC ...... F04D 29/36; F04D 19/002; F04D 25/088; F21V 33/0096
See application file for complete search history.

(56) References Cited

U.S. PATENT DOCUMENTS

| | | | | |
|---|---|---|---|---|
| 6,059,531 | A * | 5/2000 | Tai | F04D 29/34 416/207 |
| 6,378,824 | B1 * | 4/2002 | Tseng | F04D 29/34 248/220.21 |
| 6,726,453 | B1 * | 4/2004 | Hsieh | F04D 25/088 416/207 |
| 6,916,156 | B2 * | 7/2005 | Tseng | F04D 29/34 403/324 |
| 7,134,844 | B2 * | 11/2006 | Robin | F04D 25/088 416/220 R |
| 12,188,482 | B1 * | 1/2025 | Licai | F04D 29/34 |
| 2004/0001758 | A1 * | 1/2004 | Liang | F04D 29/34 416/220 A |
| 2017/0350414 | A1 * | 12/2017 | Wang | F04D 25/088 |

* cited by examiner

*Primary Examiner* — Eldon T Brockman
(74) *Attorney, Agent, or Firm* — Daniel M. Cohn

(57) ABSTRACT

A fan device is provided, including a fan assembly. The fan assembly includes fan blades, locking sliders, adjusting components, and elastic components. A peripheral side wall of the rotating module defines movable cavities, and each of the locking sliders is slidable and disposed in a corresponding one of the movable cavities. Each of the elastic components is disposed in a corresponding one of the movable cavities, and two ends of each of the elastic components are respectively abut against a top surface of the corresponding one of the movable cavities and a corresponding one of the locking sliders. In a normal state, each of elastic components drive the corresponding one of locking sliders to move toward a bottom surface of the corresponding one of the movable cavities.

10 Claims, 8 Drawing Sheets

FAN DEVICE

TECHNICAL FIELD

The present disclosure relates to a field of fan devices, and in particular to a fan device.

BACKGROUND

Fans are one kind of devices for promoting air circulation, the fans are capable of regulating indoor air and cooling human bodies, thereby being widely applied in both industrial and household environments. Specifically, fan blades are key components of the fans for generating airflow.

For fans currently available on the market, removing or mounting each fan blades requires disassembly of a corresponding fan. Such process involves removal of numerous parts and complicated disassembly steps, performing these tasks is difficult, thereby leading to high maintenance costs for the fan blades.

SUMMARY

Based on above, the present disclosure aims to provide a fan device.

Technical solutions adopted by the present disclosure are as follows.

The present disclosure provides the fan device, including a fan assembly. The fan assembly includes a rotating module, fan blades disposed on the rotating module, locking sliders, adjusting components, and elastic components. A peripheral side wall of the rotating module defines movable cavities. Each of the locking sliders is slidable and disposed in a corresponding one of the movable cavities, each of the elastic components is disposed in a corresponding one of the movable cavities and abuts against the rotating module and a corresponding one of the locking sliders, respectively. Each of the adjusting components vertically passes through one end of the rotating module and enters a corresponding one of the movable cavities to be threadedly connected to a corresponding one of the locking sliders. Each of the fan blades include a mounting end, and each mounting end of the fan blades is disposed at a corresponding one of the movable cavities. Each of the adjusting components is configured to adjust a position of the corresponding one of the locking sliders in the corresponding one of the movable cavities, so as to drive the corresponding one of the locking sliders to clamp and fix a corresponding mounting end.

Beneficial effects of the present disclosure are as follows.

The fan device of the present disclosure includes the fan assembly. The fan assembly includes the fan blades, the locking sliders, the adjusting components, and the elastic components. The peripheral side wall of the rotating module defines the movable cavities, and each of the locking sliders is slidable and disposed in the corresponding one of the movable cavities. Each of the elastic components is disposed in the corresponding one of the movable cavities, and two ends of each of the elastic components are respectively abut against a top surface of the corresponding one of the movable cavities and a corresponding one of the locking sliders. In a normal state, each of elastic components drive the corresponding one of locking sliders to move toward a bottom surface of the corresponding one of the movable cavities. When mounting the fan blades, one end of each of the fan blades enters a corresponding one of the movable cavities, a corresponding one of the adjusting components is rotated to drive a corresponding one of the locking sliders to press a corresponding one of the elastic components and further drive the corresponding one of the locking sliders to move toward the top surface of the corresponding one of the movable cavities, in this way, the fan blades are respectively locked by the locking sliders; when removing the fan blades, each of the adjusting components is rotated in an opposite direction, allowing a corresponding one of the elastic components to drive the corresponding one of the locking sliders back toward the bottom surface of the corresponding one of the movable cavities, thereby allowing the locking sliders to release the fan blades. Through cooperation between the locking sliders, the elastic components, and the adjusting components, quick mounting and removal of the fan blades are achieved, so as to reduce mounting difficulty and maintenance costs. Additionally, the fan device further includes a lighting component, so as to integrate both lighting and airflow generation functions.

DETAILED DESCRIPTION OF EMBODIMENTS

Figure 1:
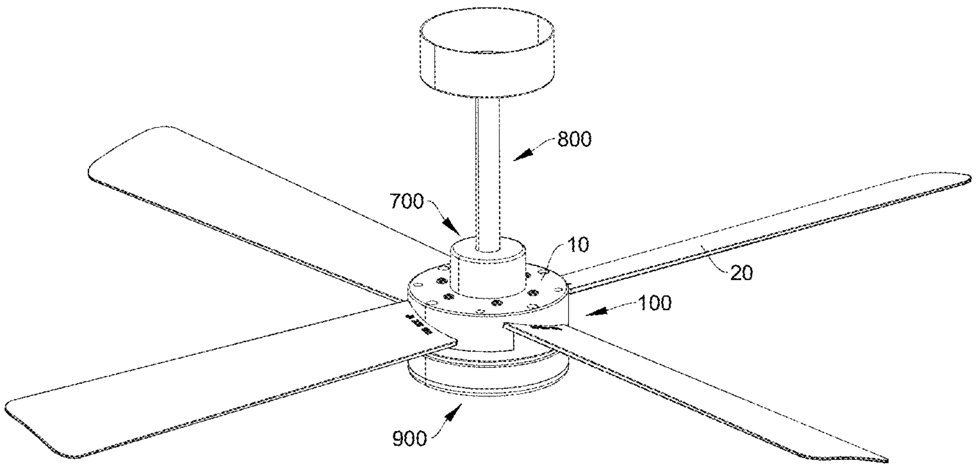
FIG. 1 is a structural schematic diagram of a fan device of the present disclosure.

As shown in FIGS. 1-10, the present disclosure provides a fan device, including a fan assembly 100 and a lighting assembly 900 disposed in a vertical direction for respectively achieving an airflow generation function and a lighting function of the fan device.

The fan assembly 100 includes a rotating module 10, fan blades 20 disposed on the rotating module 10, locking sliders 30, adjusting components 40, and elastic components 50. A peripheral side wall of the rotating module 10 defines movable cavities 11. Each of the locking sliders 30 is slidable and disposed in a corresponding one of the movable cavities 11, each of the elastic components 50 is disposed in a corresponding one of the movable cavities 11 and abuts against a top surface of the corresponding one of the movable cavities 11 and a corresponding one of the locking sliders 30, respectively. Each of the adjusting components 40 vertically passes through the rotating module 10 and enters a corresponding one of the movable cavities 11 to be threadedly connected to a corresponding one of the locking sliders 30. Each of the fan blades 20 include a mounting end 21, and each mounting end 21 of the fan blades 20 is disposed at a corresponding one of the movable cavities 11. Each of the adjusting components 40 is configured to adjust a position of the corresponding one of the locking sliders 30 in the corresponding one of the movable cavities 11, so as to drive the corresponding one of the locking sliders 30 to fixedly clamp or remove a corresponding mounting end 21. Specifically, the fan blades 20, the locking sliders 30, the adjusting components 40, and the elastic components 50 are disposed in one-to-one correspondence.

Figure 3:
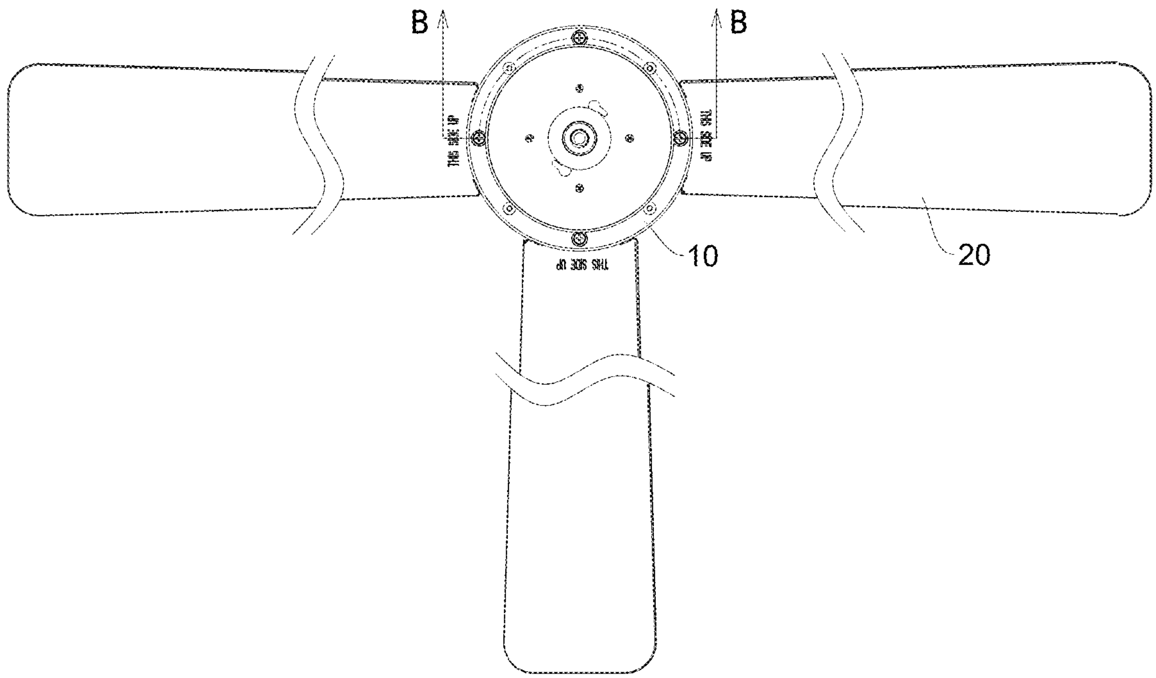
FIG. 3 is a top schematic diagram of the fan device of the present disclosure where fan blades are partially removed.
Figure 10:
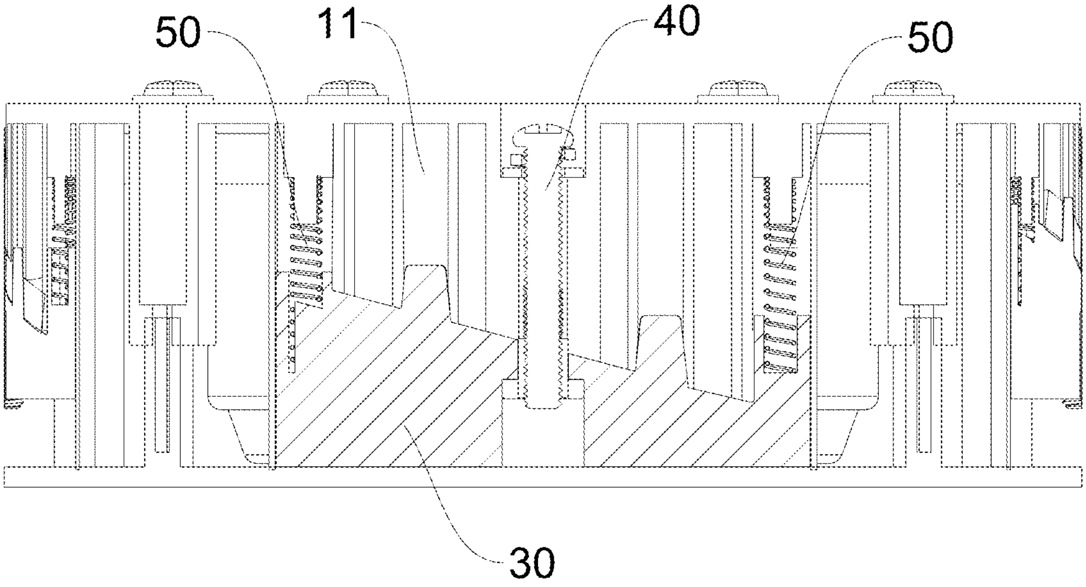
FIG. 10 is a cross-sectional schematic diagram of the fan device taken along the line B-B shown in FIG. 3.

As shown in FIGS. 3 and 10, in a normal state, an elastic force of each of the elastic components 50 drives the corresponding one of the locking sliders 30 to move toward a direction away from the top surface of the corresponding one of the movable cavities 11, so that a gap facilitating insertion of each mounting end 21 of the fan blades 20 is formed between each of the locking sliders 30 and the top surface of the corresponding one of the movable cavities 11.

Figure 2:
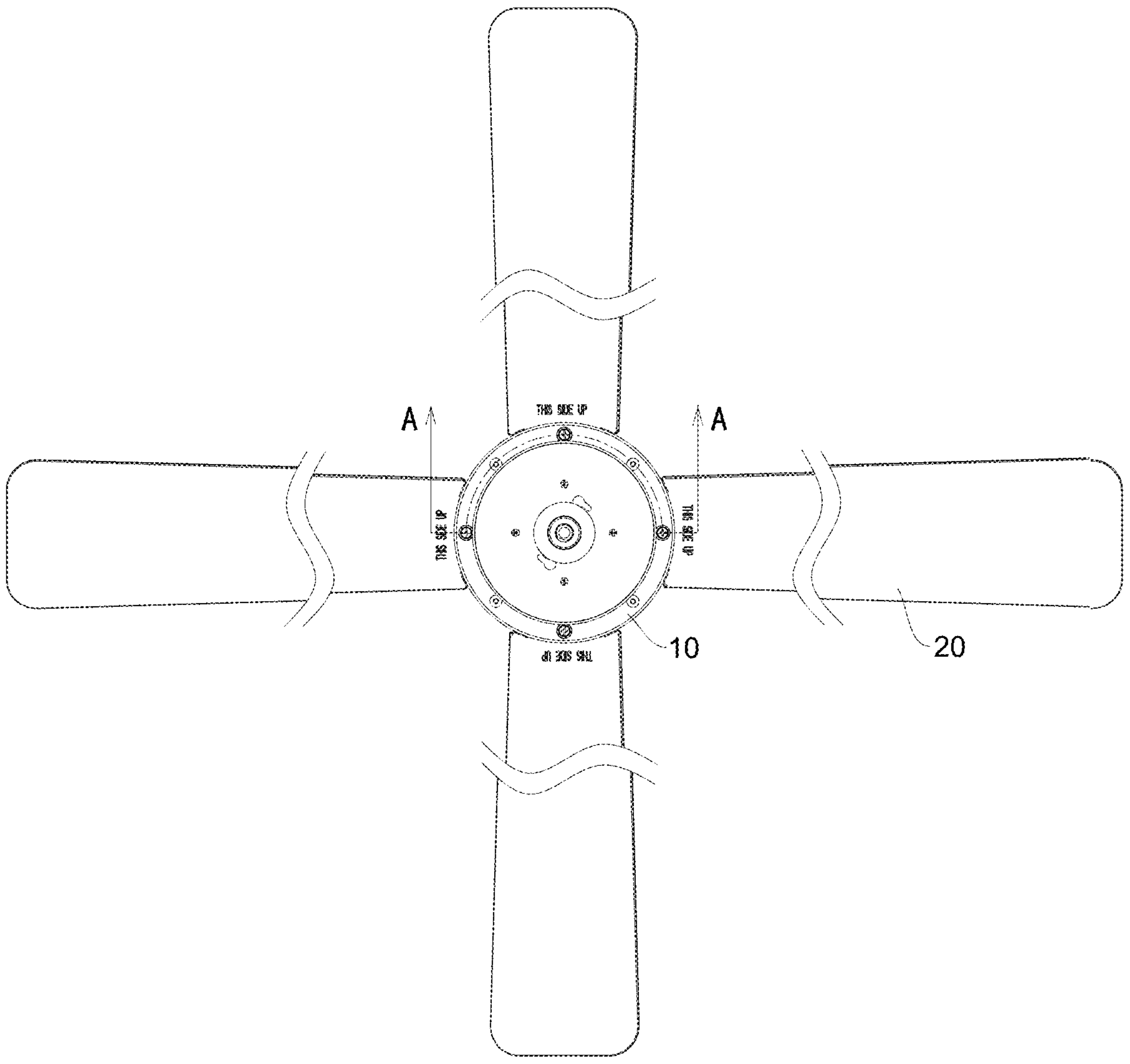
FIG. 2 is a top schematic diagram of the fan device of the present disclosure.
Figure 9:
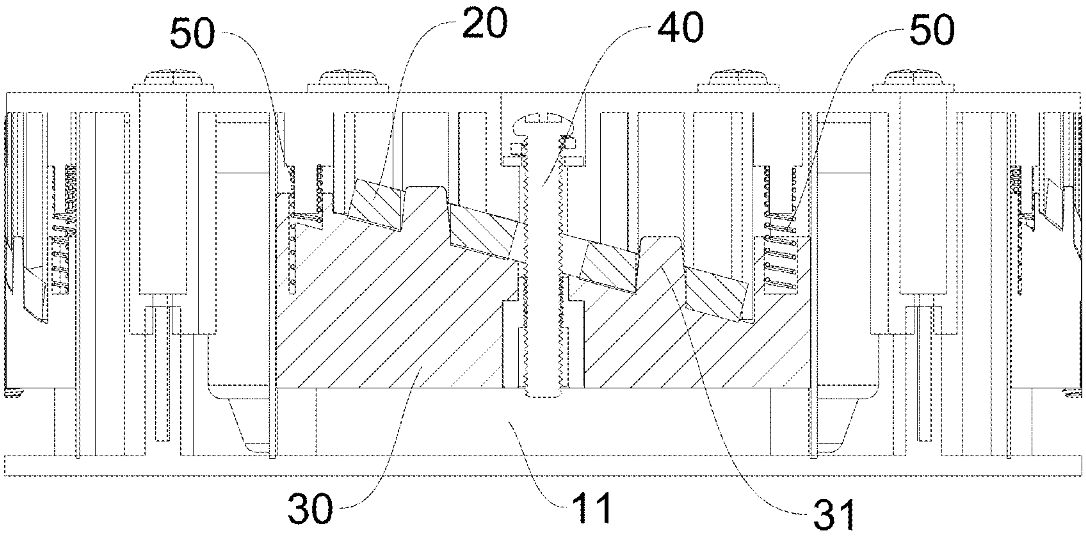
FIG. 9 is a cross-sectional schematic diagram of the fan device taken along the line A-A shown in FIG. 2.

As shown in FIGS. 2 and 9, when mounting the fan blades 20, each mounting end 21 of the fan blades 20 passes through a mounting housing 12 and enters a corresponding one of the movable cavities 11; then a corresponding one of the adjusting components 40 is rotated to drive a corresponding one of the locking sliders 30 to press a corresponding one of the elastic components 50 via threaded engagement; each of the elastic components 50 moves toward the top surface of a corresponding one of the movable cavities 11 to clamp a corresponding mounting end 21, so as to mount the fan blades 20.

When removing the fan blades 20, each of the adjusting components 40 is rotated in an opposite direction, allowing a corresponding one of the elastic components 50 to reset to drive a corresponding one of the locking sliders 30 release a corresponding mounting end 21, so as to remove the fan blades. Through cooperation between the locking sliders 30, the elastic components 50, and the adjusting components 40, the fan device of the present disclosure achieve quick mounting and removal of the fan blades 20, which reduce mounting difficulty and maintenance costs. Moreover, the fan device of the present disclosure further provides the locking sliders 30 to respectively clamp and fix the fan blades 20 to improve mounting stability of the fan blades 20.

Figure 4:
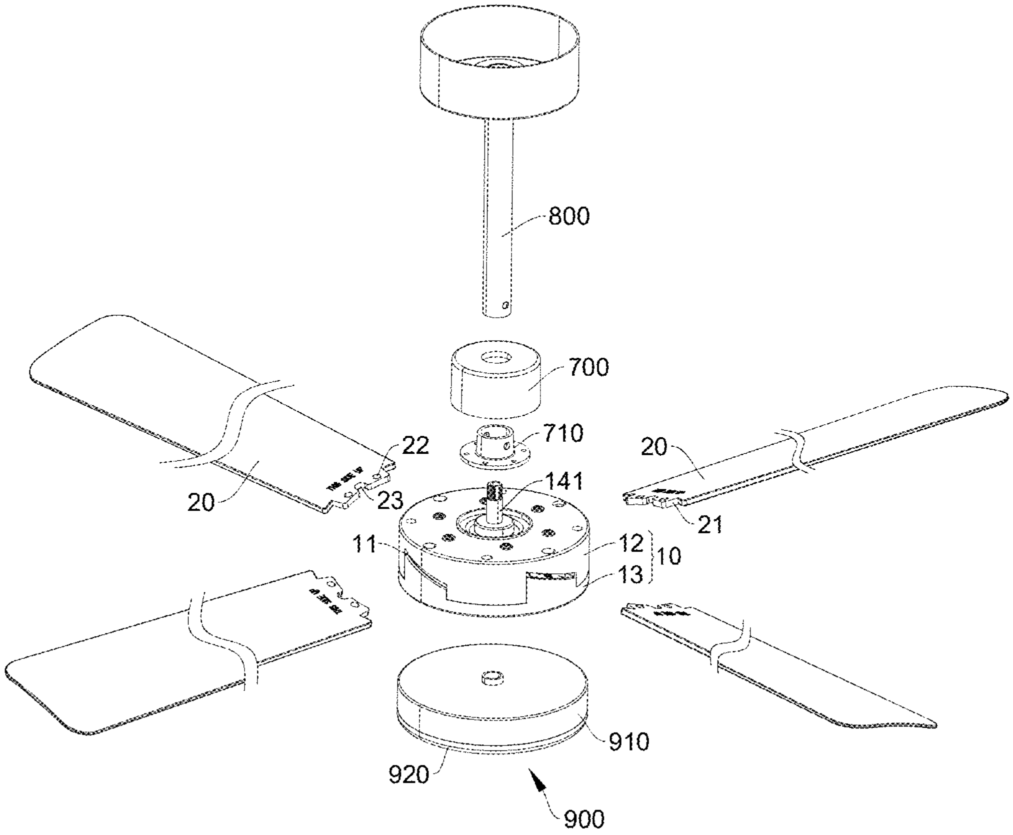
FIG. 4 is an exploded structural schematic diagram of the fan device shown in FIG. 1.
Figure 5:
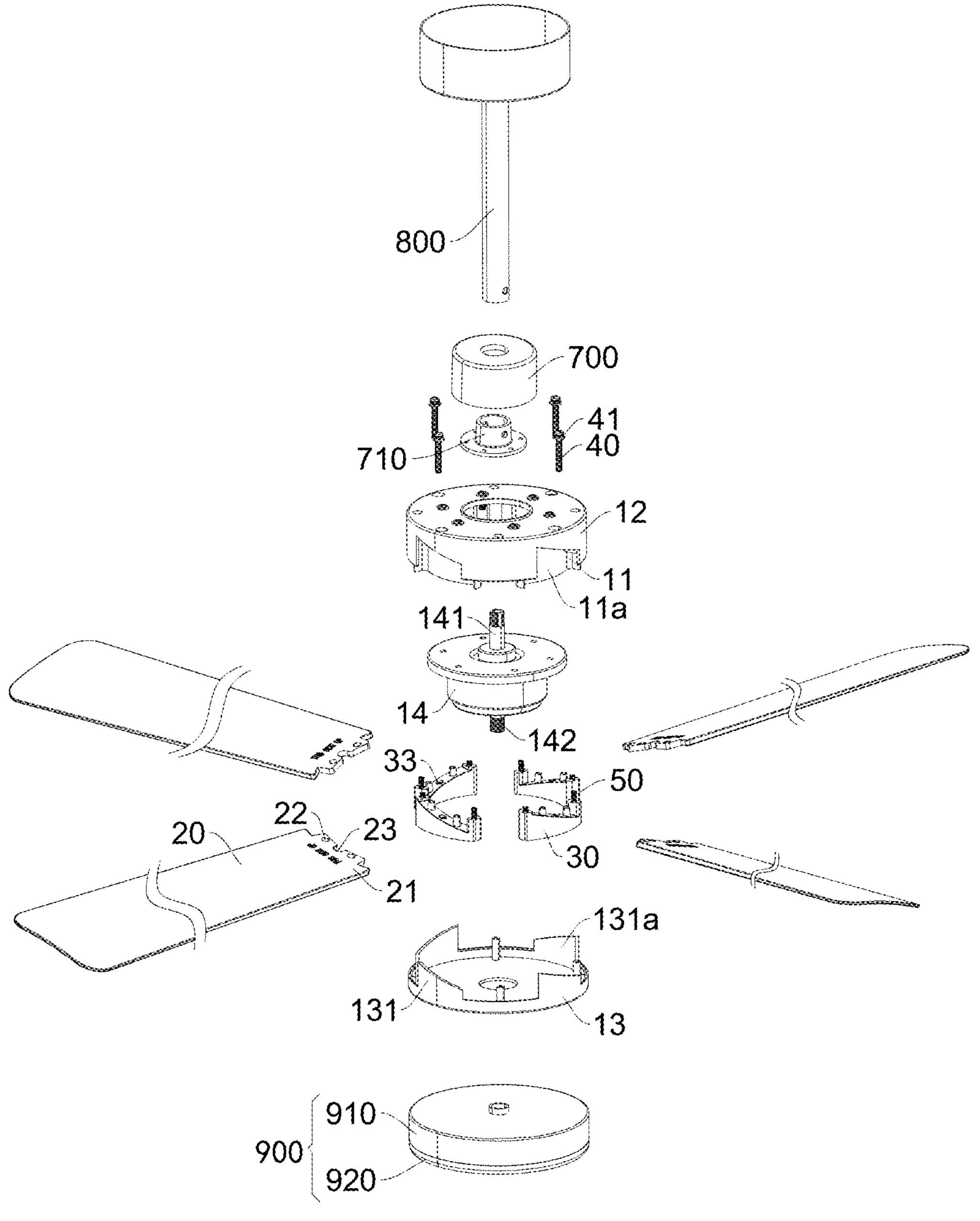
FIG. 5 is a further exploded structural schematic diagram of the fan device shown in FIG. 4.
Figure 6:
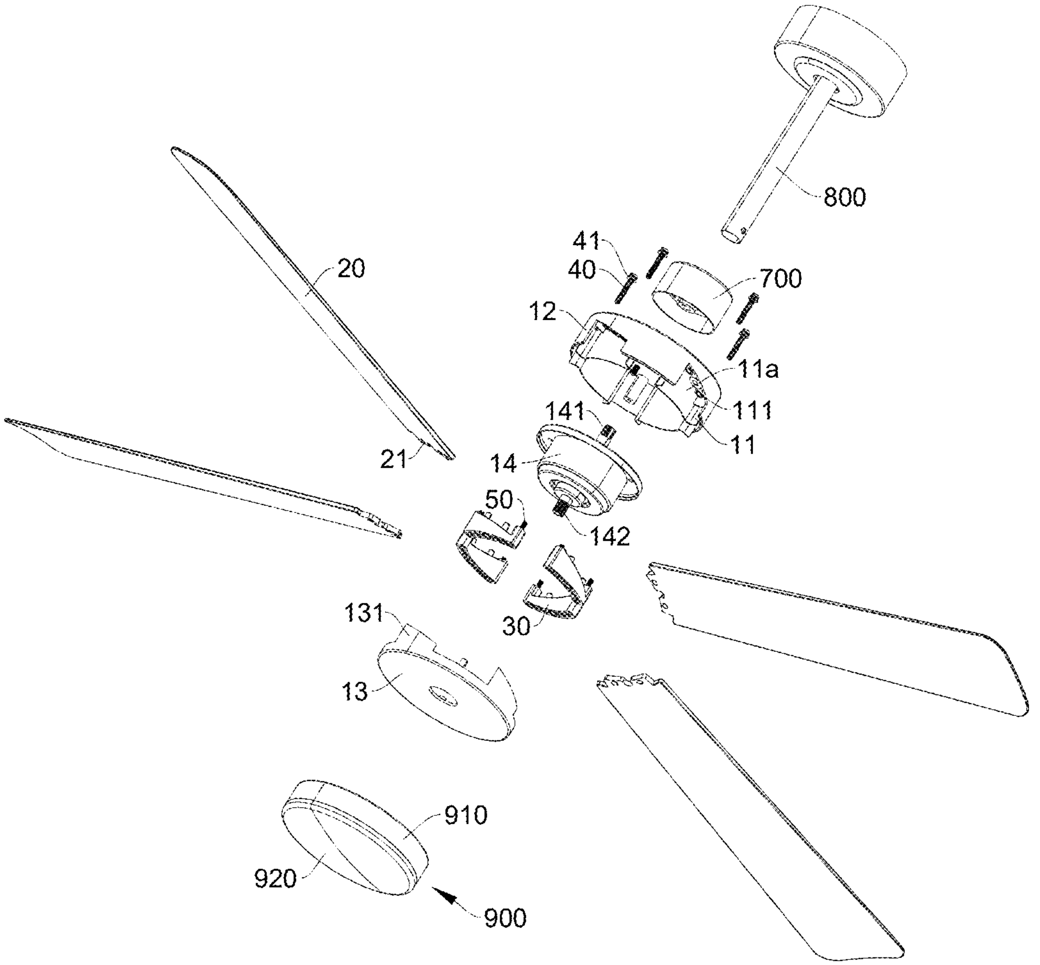
FIG. 6 is an exploded structural schematic diagram of the fan device shown in FIG. 5, viewed from another angle.
Figure 7:
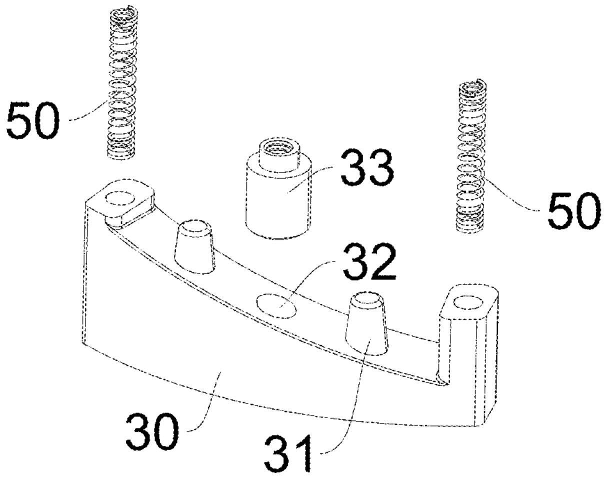
FIG. 7 is a structural schematic diagram of a locking slider shown in FIG. 5.

As shown in FIGS. 4-6, the rotating module 10 includes a rotating base and a driving component 14, the driving component 14 is disposed in the rotating base, and a driving end of the driving component 14 is fixedly connected to the rotating base. The driving component 14 drives the rotating base to rotate. Each mounting end 21 of the fan blades 20 is inserted into a side wall of the rotating base, and the fan blades 20 rotate along with rotation of the rotating base, so as to achieve the airflow generation function. In the embodiments, the driving component 14 is a motor. Specifically, the rotating base includes the mounting housing 12 and a bottom cover 13, the mounting housing 12 and the bottom cover 13 are matched with each other in a vertical direction and are connected and fixed through screws. The driving end of the driving component 14 is fixedly connected to the mounting housing 12. The movable cavities 11 are defined on a peripheral side wall of the mounting housing 12, baffles 131 are disposed at an edge of an upper end surface of the bottom cover 13. When the mounting housing 12 is in contact and matched with the bottom cover 13, each of the baffles 131 partially covers a corresponding one of the movable cavities 11, the baffles 131 are configured to prevent the locking sliders 30 from disengaging from the movable cavities 11.

A first connecting column 141 vertically extends upward from an upper end surface of the driving component 14, a second connecting column 142 vertically extends downward from a lower end surface of the driving component 14, an upper end of the first connecting column 141 passes through the mounting housing 12 for structural connection, a lower end of the second connecting column 142 passes through the bottom cover 13 for structural connection. It should be noted that the first connecting column 141 and the second connecting column 142 are both connected to a stator of the motor, that is, the first connecting column 141 and the second connecting column 142 do not rotate.

Figure 8:
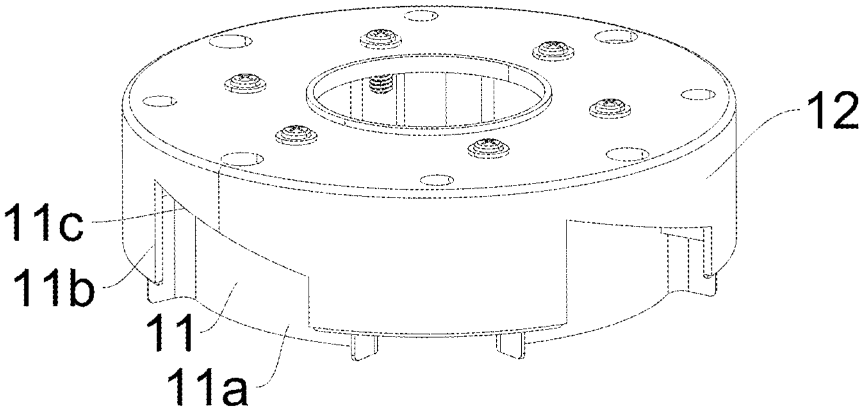
FIG. 8 is a structural schematic diagram of a mounting housing shown in FIG. 5.

Please further refer to FIGS. 6 and 8, in the embodiments, the rotating base is cylindrical, and the movable cavities 11 are distributed on a side wall of the mounting base in a circumferential array. Correspondingly, each of the movable cavities 11 includes a first guide surface 11*a*, each the baffles 131 includes a second guide surface 131*a*, each first guide surface 11*a* and a corresponding second guide surface 131*a* are arc surfaces parallel to each other, two side walls of each of the locking sliders 30 are respectively matched with a corresponding first guide surface 11*a* and a corresponding second guide surface 131*a* for guiding, in this way, a vertical movement of each of the locking sliders 30 is limited.

In the embodiments, in order to ensure airflow strength of the fan device, the fan blades 20 are required to be inclined. Specifically, a top surface of each of the locking sliders 30 is an inclined surface, each of the movable cavities 11 defines a groove opening 11*b*, each groove opening 11*b* includes atop edge 11*c*, and each top edge 11*c* is an inclined arc structure. When each mounting end 21 of the fan blades 20 is disposed in the corresponding one of the movable cavities 11, the top surface of each of the locking sliders 30 is attached to a bottom surface of a corresponding one of the fan blades 20, and each top edge 11*c* is attached to a top surface of a corresponding one of the fan blades 20.

Please refer to FIGS. 4-6, each mounting end 21 of the fan blades 20 defines at least one positioning hole 22 and a limiting groove 23, at least one inserting column 31 is dispose on an upper end surface of each of the locking sliders 30, each of the locking sliders 30 defines a connecting hole 32 facing upward, a threaded sleeve 33 is fixedly disposed on an inner side of each connecting hole 32, at least one connecting sleeve 111 is disposed on a top surface of each of the movable cavities 11. Each at least one positioning hole 22 is coaxially aligned with a corresponding at least one inserting column 31 and a corresponding at least one connecting sleeve 111. When each of the locking sliders moves to the top surface of the corresponding one of the movable cavities 11 and clamps a corresponding mounting end 20, a corresponding at least one inserting column 31 passes through a corresponding at least one positioning hole 22 to insert into a corresponding at least one connecting sleeve 111 for locking a corresponding one of the fan blades 20. A corresponding at least one positioning hole 22, a corresponding at least one inserting column 31, and a corresponding at least one connecting sleeve 111 cooperate with each other to position a corresponding one of the fan blades 20, a corresponding one of the locking sliders 30, and a corresponding one of the movable cavities 11 with respect to each other. Each limiting groove 23 is disposed corresponding to a corresponding threaded sleeve 33 and is configured to limit a corresponding one of the adjusting components 40. An indication mark is placed on the top surface of each of the fan blades 20 to remind users of a correct mounting orientation of the fan blades 20 for error proofing.

Please refer to FIGS. 5 and 6, in the embodiments, the adjusting components 40 are bolts, and spacers 41 is respectively sleeved on outer sides of the adjusting components 40, so as to improve a locking force of each of the adjusting components 40. External threads of each the bolts are matched with internal threads of a corresponding threaded sleeve 33, so that the locking sliders 30 are driven to move in the vertical direction when the bolts rotate.

Please refer to FIGS. 1-6, the lighting assembly 900 includes an outer housing 910, a lampshade 920, and a light-emitting module (not shown in the drawings). The light-emitting module is disposed in the outer housing 910. The lampshade 920 is made of a light-transmissive material and is disposed at a lower end of the outer housing 910. The lighting module is selected from lamp tubes with different models. The lighting module is configured to emit light in the outer housing 910, and the light emitted by the lighting module passes through the lampshade 920 to achieve the lighting function of the fan device. The outer housing 910 is threadedly connected to the second connecting column 142 to connect the lighting assembly 900 with the fan assembly 100.

Please refer to FIGS. 1-4, the fan device further includes a hanging rod 800 and a connecting base 700, the connecting base 700 is disposed at a lower end of the hanging rod 800, a connecting component 710 is disposed in the connecting base 700. A lower end of the hanging rod 800 extends into the connecting component 710, and a pin is provided to pass through the connecting component 710 and the hanging rod 800 to complete connection between the hanging rod 800, the connecting base 700 and the connecting component 710. In addition, the connecting component 710 is threadedly connected to the first connecting column 141, so as to the fan assembly 100 with the connecting base 700.

Compared with the prior art, the fan device of the present disclosure includes the fan assembly 100. The fan assembly 100 includes the rotating module 10, the fan blades 20, the locking sliders 30, the adjusting components 40, and the elastic components 50. The peripheral side wall of the rotating module 10 defines the movable cavities 11, and each of the locking sliders 30 is slidable and disposed in the corresponding one of the movable cavities 11. Each of the elastic components 50 is disposed in the corresponding one of the movable cavities 11, and two ends of each of the elastic components 50 are respectively abut against the top surface of the corresponding one of the movable cavities 11 and the corresponding one of the locking sliders 30. In a normal state, each of elastic components 50 drive the corresponding one of locking sliders 30 to move toward a bottom surface of the corresponding one of the movable cavities 11. When mounting the fan blades 20, one end of each of the fan blades 20 enters a corresponding one of the movable cavities 11, a corresponding one of the adjusting components 40 is rotated to drive a corresponding one of the locking sliders 30 to press a corresponding one of the elastic components 50 and further drive the corresponding one of the locking sliders 30 to move toward the top surface of the corresponding one of the movable cavities 11, in this way, the fan blades 20 are respectively locked by the locking sliders 30; when removing the fan blades 20, each of the adjusting components 40 is rotated in an opposite direction, allowing a corresponding one of the elastic components 50 to drive the corresponding one of the locking sliders 30 back toward the bottom surface of the corresponding one of the movable cavities 11, thereby allowing the locking sliders 30 to release the fan blades 20. Through cooperation between the locking sliders 30, the elastic components 50, and the adjusting components 40, quick mounting and removal of the fan blades 20 are achieved, so as to reduce mounting difficulty and maintenance costs. Additionally, the fan device further includes a lighting component 900, so as to integrate both lighting and airflow generation functions.

The above description only represents a preferred technical solution of the present disclosure, and the description thereof is relatively specific and detailed, but cannot be understood as a limitation on a patent scope of the present disclosure. It should be noted that, for those skilled in the art, several modifications and improvements may be made without departing from a concept of the present disclosure, and the present disclosure is also intended to include these modifications and variations.

What is claimed is:

1. A fan device, comprising:

a fan assembly;

wherein the fan assembly comprises a rotating module, fan blades disposed on the rotating module, locking sliders, adjusting components, and elastic components;

wherein a peripheral side wall of the rotating module defines movable cavities;

wherein each of the locking sliders is slidable and disposed in a corresponding one of the movable cavities, each of the elastic components is disposed in a corresponding one of the movable cavities and abuts against the rotating module and a corresponding one of the locking sliders, respectively;

wherein each of the adjusting components vertically passes through one end of the rotating module and enters a corresponding one of the movable cavities to be threadedly connected to a corresponding one of the locking sliders;

wherein each of the fan blades comprises a mounting end, and each mounting end of the fan blades is disposed at a corresponding one of the movable cavities;

wherein each of the adjusting components is configured to adjust a position of the corresponding one of the locking sliders in the corresponding one of the movable cavities, so as to drive the corresponding one of the locking sliders to clamp and fix a corresponding mounting end.

2. The fan device according to claim 1, wherein each mounting end of the fan blades defines at least one positioning hole, at least one inserting column is disposed on an upper end surface of each of the locking sliders, at least one connecting sleeve is disposed on a top surface of each of the movable cavities;

each at least one positioning hole is coaxially aligned with a corresponding at least one inserting column and a corresponding at least one connecting sleeve; and when each of the locking sliders clamps a corresponding mounting end, a corresponding at least one inserting column passes through a corresponding at least one positioning hole to insert into a corresponding at least one connecting sleeve.

3. The fan device according to claim 1, wherein each of the locking sliders defines a connecting hole facing upward, a threaded sleeve is fixedly disposed on an inner side of each connecting hole; and each threaded sleeve is configured to be threadedly connected to a corresponding one of the adjusting components.

4. The fan device according to claim 3, wherein each mounting end of the fan blades defines a limiting groove, each limiting groove is disposed corresponding to a corresponding threaded sleeve.

5. The fan device according to claim 1, wherein a top surface of each of the locking sliders is an inclined surface, each of the movable cavities defines a groove opening, each groove opening comprises a top edge, and each top edge is an inclined arc structure; and when each mounting end of the fan blades is disposed in the corresponding one of the movable cavities, the top surface of each of the locking sliders is attached to a bottom surface of a corresponding one of the fan blades, and each top edge is attached to a top surface of a corresponding one of the fan blades.

6. The fan device according to claim 1, wherein the rotating module comprises a rotating base and a driving component, the driving component is disposed in the rotating base;

a driving end of the driving component is fixedly connected to the rotating base, and the driving component drives the rotating base to rotate; and each mounting end of the fan blades is inserted into a side wall of the rotating base.

7. The fan device according to claim 6, wherein the rotating base comprises a mounting housing and a bottom cover, the mounting housing and the bottom cover are matched with each other in a vertical direction;

the driving end of the driving component is fixedly connected to the mounting housing;

the movable cavities are defined on a peripheral side wall of the mounting housing, baffles are disposed at an edge of an upper end surface of the bottom cover; and when the mounting housing is in contact and matched with the bottom cover, each of the baffles partially covers a corresponding one of the movable cavities.

8. The fan device according to claim 7, wherein the fan device further comprises a hanging rod and a connecting base, the connecting base is disposed at a lower end of the hanging rod, a connecting component is disposed in the connecting base; and a first connecting column vertically extends upward from an upper end surface of the driving component, an upper end of the first connecting column passes through the mounting housing to fixedly connect to the connecting component.

9. The fan device according to claim 1, wherein the fan device further comprises a lighting assembly, the lighting assembly is disposed below the fan assembly and comprises an outer housing, a lampshade, and a light-emitting module; and the light-emitting module is disposed in the outer housing, and the lampshade is disposed at a lower end of the housing.

10. A fan device, comprising:

a fan assembly;

wherein the fan assembly comprises a rotating module, fan blades disposed on the rotating module, locking sliders, adjusting components, and elastic components;

wherein the rotating module comprises a mounting housing and a bottom cover, the mounting housing and the bottom cover are matched with each other in a vertical direction;

wherein a peripheral side wall of the rotating module defines movable cavities after the mounting housing is in contact and matched with the bottom cover;

wherein each of the locking sliders is slidable and disposed in a corresponding one of the movable cavities, each of the elastic components is disposed in a corresponding one of the movable cavities and abuts against a top surface of the corresponding one of the movable cavities and a top surface of a corresponding one of the locking sliders, respectively;

wherein each of the adjusting components vertically passes through one end of the rotating module and enters a corresponding one of the movable cavities to be threadedly connected to a corresponding one of the locking sliders;

wherein each of the fan blades comprises a mounting end, and each mounting end of the fan blades is disposed at a corresponding one of the movable cavities;

wherein each of the adjusting components is configured to adjust a position of the corresponding one of the locking sliders in the corresponding one of the movable cavities, so as to drive the corresponding one of the locking sliders to fixedly clamp or remove a corresponding mounting end.

* * * * *